W. J. MOWBRAY.
METER.
APPLICATION FILED JUNE 21, 1909.
1,024,218.
Patented Apr. 23, 1912.
2 SHEETS—SHEET 1.
Fig. 1,
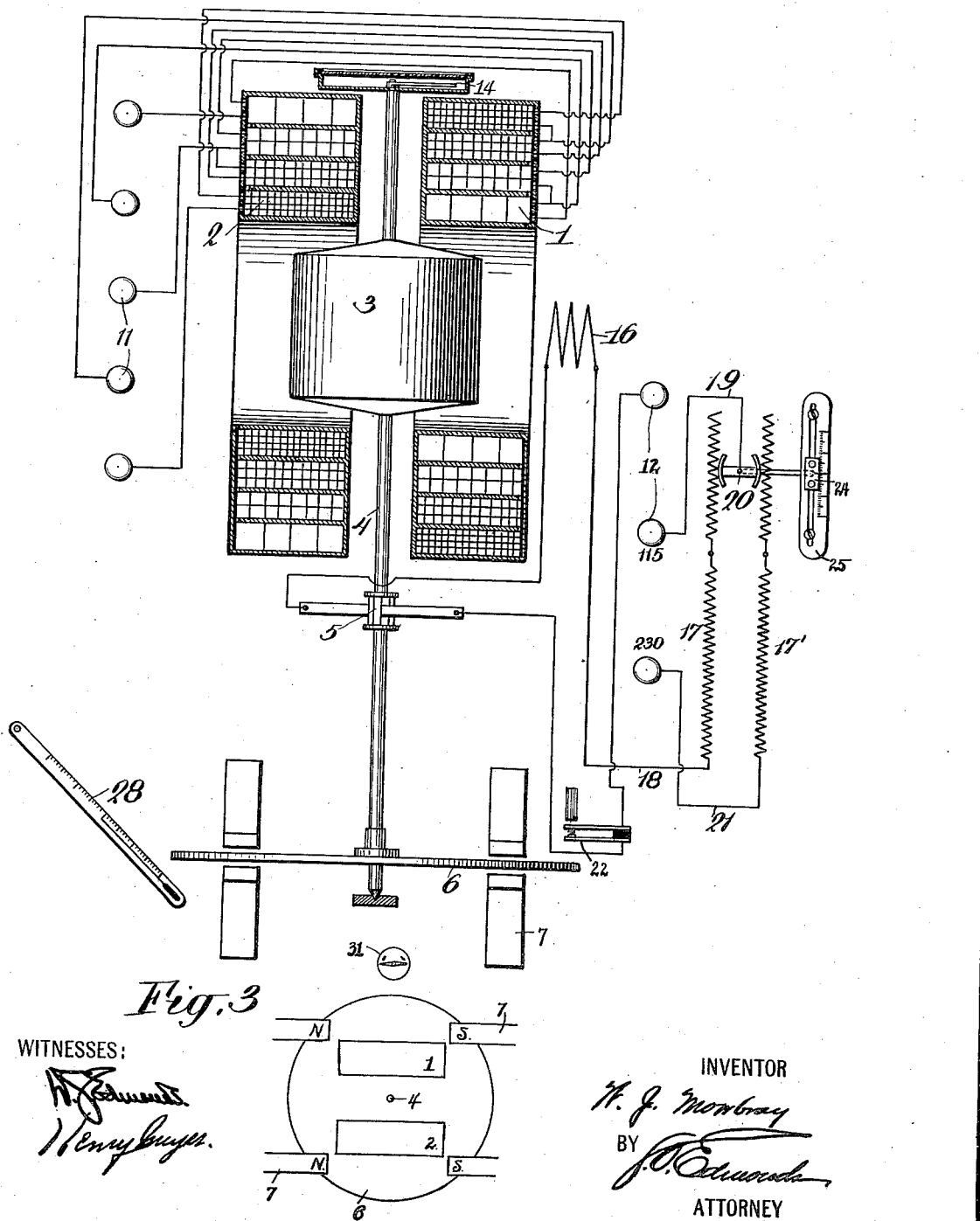
Fig. 3
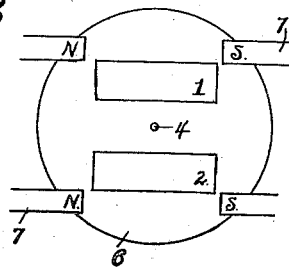
WITNESSES:
INVENTOR
W. J. Mowbray
BY
ATTORNEY

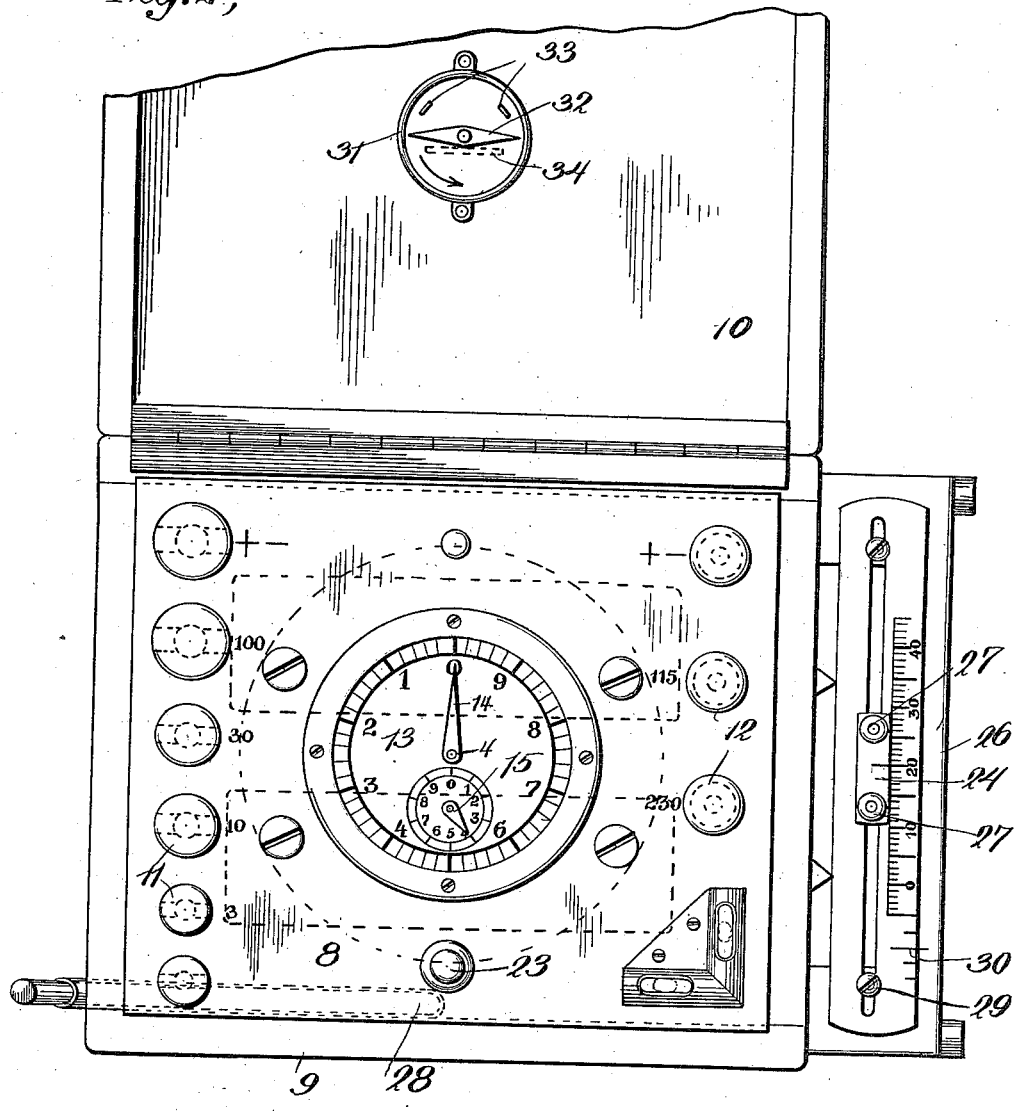

UNITED STATES PATENT OFFICE.

WILLIAM J. MOWBRAY, OF PROVIDENCE, RHODE ISLAND.

METER.

1,024,218.  Specification of Letters Patent.  Patented Apr. 23, 1912.

Application filed June 21, 1909.  Serial No. 503,297.

*To all whom it may concern:*

Be it known that I, WILLIAM J. MOWBRAY, a citizen of the United States, residing at Providence, in the county of Providence and State of Rhode Island, have invented certain new and useful Improvements in Meters, of which the following is a specification.

This invention relates to electrical testing-meters adapted particularly for use in testing integrating watt-meters of the type commonly employed in buildings for measuring the amount of electric energy consumed by the electric translating devices installed in the building.

More particularly, the invention relates to testing-meters of the type shown in U. S. Letters Patent heretofore granted to me and numbered 858,011 and 860,987.

The object of my present invention is to effect certain improvements in the construction of meters of this type, whereby greater accuracy, greater facility of adjustment and greater convenience in use are secured.

In accordance with my invention, I employ a meter of the motor type, having field-coils adapted to be connected in series in the line, an armature adapted to be connected across the line, and a disk rotating in the fields of permanent magnets to retard the rotation of the moving element of the meter, this meter being specially constructed so as to adapt it for testing purposes. In testing-meters of this type, the varying resistance of the potential circuit under changes of temperature, due to the passage of the current therein, has always introduced more or less of an error, and various expedients have been resorted to for eliminating or reducing this error. My present invention contemplates the employment of an improved means for reducing the error due to the heating of the potential circuit, to such a small amount that it becomes negligible, and this in such a way as to make the meter more convenient to use and to make it readily adjustable. To this end I provide a resistance in the potential circuit of the meter having a temperature coefficient of resistance which is practically zero, and the ohmic value of this resistance is such that it forms a large proportion of the total resistance of the potential circuit of the meter. In this way, the heating of the wires forming the potential circuit of the meter has practically no effect upon the resistance of that circuit and hence upon the speed of the meter on a given load.

In my improved meter, as in those heretofore employed, the retardation of the moving element is effected by a disk on the shaft rotating in the fields of permanent magnets. The current generated in this disk due to its rotation in the magnetic field is so small that it has no appreciable effect in heating the metal of the disk and thereby changing its resistance, but a change in the temperature of the surrounding air may materially affect the resistance of the disk and hence its retarding effect. To prevent such variation, metal of zero temperature coefficient might be employed in the disk but such metal is not a good conductor and it is essential that material of good conductivity be employed in the disk in order that the requisite braking effect may be obtained. In accordance with my invention, I provide means for effecting an adjustment whereby the effect of changes in the temperature of the surrounding air upon the retarding disk may be readily compensated for. In combination with this compensating means, I employ a simple means for effecting an adjustment to compensate for other changes which may take place, as, for instance, those due to jarring of the meter and thus affecting the friction in the bearings for the moving element. In testing-meters of this type, it is essential, in order to secure accurate results, that when using the instrument to test a meter the current should flow through the field-coils in the same direction as that in which it flowed when the meter was being calibrated, since otherwise an error will be introduced known as a "polarity error." Furthermore, as is well known, the rotation of the moving element of the meter with a given strength of field-magnetism may be affected by stray fields, as, for instance, that of the permanent magnets operating in conjunction with the retarding disk and the magnetism of the earth. My invention also contemplates the provision of means whereby errors due to these causes may be readily eliminated.

I have illustrated the preferred embodiment of my invention in the accompanying drawings, in which—

Figure 1 is a diagrammatic view of the meter, showing the electrical connections thereof, Fig. 2 is a top view of the meter broken away in part, and Fig. 3 is a diagrammatic view illustrating certain of the parts of the meter and the electrical connections thereto.

Referring to these drawings, the meter, generally considered, is like the integrating watt-meters now in common use, in that it employs a pair of field-coils 1 and 2, mounted one on either side of an armature 3, which is secured upon a shaft 4 mounted in suitable bearings and carrying a commutator 5, the segments of which are connected to the coils of the armature 3. The shaft 4 also carries a brake-disk 6, which rotates between the poles of one or more permanent magnets 7. In the testing-meter, these parts are mounted in a suitable frame, which is suspended from a top-plate 8, and the whole is inclosed within a suitable case 9 having a hinged cover 10. On the plate 8 are a plurality of current binding-posts 11 and a plurality of potential binding-posts 12. Plate 8 also carries a suitable dial 13, over which moves an index 14 carried by the upper end of the shaft 4, and if desired an auxiliary index 15 may be employed, moving over a suitable scale and carried by a shaft which is geared to the shaft 4 in a suitable ratio, preferably ten to one.

The field-coils 1 and 2 of the instrument preferably consist of concentric sections, the several sections being formed of wire differing in cross-section and the sections of the two coils being oppositely arranged with respect to their distance from the armature 3. The connections between the several sections of the two coils and between those sections and the binding-posts 11 are preferably arranged as described in Patent No. 858,011 above referred to, and therefore will not be fully described herein, it being the purpose of this construction and arrangement of the field-coil section to obtain substantially the same number of ampere-turns affecting the armature 3 with different strengths of current flowing in the line, so that the testing-meter may be run on approximately full load while testing a consumer's meter on fractional loads.

As is usual in both consumers' integrating watt-meters and in testing watt-meters, the potential circuit of my meter includes, in addition to the armature 3, an auxiliary field-coil 16 and a resistance 17, these being all connected in series. In order to secure rotation of the moving element of the meter accurately proportional to the voltage across lines, it is essential that the resistance of this potential circuit should not vary with changes in temperature, and in order to guard against such variation in resistance it has heretofore been the practice to heat the wire of this potential circuit to such a point that radiation of heat takes place as rapidly as the generation of heat, so that the resistance will remain constant before starting the test. Thus, by passing the normal current through the potential circuit for a considerable period, the wire therein may be heated to the requisite temperature, or in order to save time the potential circuit may be subjected to double voltage. When using either of these methods, however, much time is consumed in preparing for a test and somewhat of an error is introduced, due to the varying extent to which the wire of the potential circuit becomes cooled in the intervals between tests.

In accordance with my invention, I so construct the parts of the potential circuit of the meter that no preliminary heating of the wire is necessary, and the error due to changes of resistance of the wire of the potential circuit is reduced to such extent that it becomes negligible. To this end, I employ a resistance in the potential circuit which forms a large part of the total resistance of the potential circuit and which is made of a material of zero temperature coefficient. Such a metal might be employed for the entire potential circuit, were it not that the resistance of such a metal is high with respect to that of copper and it is necessary to use in the armature of the meter a metal of good conductivity in order to produce the requisite torque by employing the necessary number of ampere-turns in the armature without making the armature of too great bulk and weight. In the drawings, I have shown the resistance 17 forming a part of the potential circuit, and this resistance 17 is made of a metal of zero temperature coefficient. Also, the ohmic value of this resistance 17 is quite large with respect to that of the coils of the armature 3 and auxiliary field-coil 16, so that the changes in the resistance of the armature 3 and starting coil 16 due to the heating thereof by the current passing through them is very small with relation to the total resistance of the potential circuit.

In order to make the resistance of the armature very small without reducing the torque of the meter, I employ in the armature wire of larger cross-section than has been heretofore employed in both testing-meters and consumers' meters, and employ in the potential circuit of the meter a current of greater amperage than has heretofore been usual, the use of this greater current being permissible since only a small number of the testing-meters are used in a system and these are connected in circuit for only such short periods. This reduction in the drop of voltage across the armature offers the further advantage that the difference in potential between adjacent segments of the commutator is greatly decreased and the sparking at the commutator is, therefore, lessened.

In order to adapt the meter for use on either single or double voltage circuits, I employ an additional binding-post 12 and a second resistance of zero temperature coefficient, as indicated at 17', and I so arrange the connections to the resistances that when the lead from one side of the circuit is connected to the binding-post marked 115 in Fig. 2, only the resistance 17 is in circuit, and when that lead is changed from that binding-post to the post marked 230, both the resistance 17 and the resistance 17' are in circuit. Referring to Fig. 1, it will be seen that a wire 18 leads from the auxiliary field-coil 16 to the resistance 17 and a wire 19 leads from a contact 20 engaging the resistance 17 to the binding-post marked 115. The contact 20 is arranged to cross-connect the resistances 17 and 17', and a wire 21 leads from the resistance 17' to the binding-post marked 230. It will thus be seen that when the meter is used on either a single or double voltage circuit a very large proportion of the drop in voltage in the potential circuit of the meter is in a resistance of zero temperature coefficient, and therefore the change in the resistance of the potential circuit due to heating by the current flowing therein is very small and in practice I find it to be so small as to be negligible. In this potential circuit I provide a switch 22, operated by a push-button 23 on the plate 8 of the instrument, so that the circuit may be closed and held closed during the short interval of time while the test-meter and the consumer's meter are being run upon the same load to compare the rotations of their moving elements during this interval.

As above pointed out, the retardation of the rotation of the moving element of the meter is effected by the disk 6 of conducting material moving in the magnetic fields of permanent magnets 7. This relative movement causes currents of electricity to be generated in the disk 6, but these currents are never sufficiently large to cause appreciable heating of the metal of the disk. However, the resistance of the metal of the disk 6 is affected by changes of temperature of the disk in accordance with changes of temperature of the surrounding air, and such change may be so great as to vary the retarding effect of the disk 6 with respect to the torque of the moving element of the meter so much as to affect the accuracy of the instrument. I have, therefore, provided means for compensating for the variation in the retarding effect of the disk 6 in accordance with changes of the temperature of the surrounding air. This means consists of a thermometer placed in close proximity to the disk 6 and a means for varying the resistance in the potential circuit of the meter in accordance with the indications of the thermometer. The resistances 17, 17' are preferably mounted in a suitable housing, which is secured to one side of the casing 9 of the meter and is provided with suitable openings for radiation. These resistances are preferably wires wound on cards and the wire of each resistance is exposed along a line, so that it may be engaged by the contact 20. This contact is fixed to a slide 24 adapted to move back and forth upon a plate 25 secured to the top of the housing 26 for the two resistances, and screws 27 are provided for securing the slide 24 with its contact 20 to the plate 25. The slide 24 is provided with a mark, as shown in Fig. 2, and the plate 25 has a scale marked off thereon. The scale on the plate 25 is arranged in accordance with the indications of the thermometer above mentioned, so that by moving the slide 24 to a position with reference to the scale on the plate 25 corresponding with the indication of the thermometer, the effect of changes of temperature upon the retarding disk 6 will be compensated for. The thermometer is arranged to be mounted in proximity to the disk 6; preferably an opening is provided in the casing 9 of the instrument, and the thermometer 28 is inserted through this opening, the opening being so positioned as to hold the thermometer with its lower end close to the disk 6.

As an instrument of this character is delicate and may be subjected to slight wear or injury in use, it is necessary to calibrate it from time to time, and I have therefore provided means for readily effecting an adjustment in order to make the instrument accurate when calibrating it. To this end I mount the plate 25 upon the housing 26 in such a manner that it may be moved in the direction of its length through a short range, this being preferably done by providing screws 29 for holding the plate upon the housing and slots in the plate through which these screws pass, so that by loosening the screws slightly the plate may be moved in the direction of its length. When the plate is so moved, the slide 24 attached to the plate and the contact 20 on the slide move with the plate relatively to the resistances 17, 17', so that by moving plate 25 more or less resistance is inserted in the potential circuit of the meter, so as to make the meter run faster or slower. To facilitate making this adjustment, I provide a mark upon the housing 26 and an auxiliary scale upon the plate 25, as indicated at 30, the markings of this scale indicating per cent. of fast or slow running of the meter. So that if the meter is found to be running one per cent. fast with reference to the meter used in calibrating, it is only necessary to loosen the screws 29, move the plate 25 a distance equal to one space on the scale 30 and then tighten the screws 29 again.

A testing-meter of the character herein shown will not give accurate results if used with the current flowing through the meter in a direction opposite to that in which it flowed when the meter was calibrated, and the readings will be subject to what is known as "polarity error." I have, therefore, provided means for determining whether or not the meter is being used with the current flowing in the same direction as when it was calibrated, this means consisting of a special form of magnetic compass. A compass of the ordinary type would not be suitable for this purpose, as its needle is free to assume a position such that its polarity may be reversed by the flux of the field-coils when current is passed through the latter, and such a reversal would not be apparent and might result in improper use of the instrument for a considerable period. Instead, I employ a compass the needle of which has but a limited movement, such movement being sufficient to give the desired indication but insufficient to permit the needle to assume a position in which it may have its polarity reversed by the field-coil flux. This compass may be mounted in any suitable portion of the instrument, but is preferably fixed to the under side of the cover 10 of the casing 9, as shown at 31. This compass has the ordinary pivoted needle 32, but the movement of this needle is limited by stops 33 projecting from the base of the compass. It will be seen that the needle can not move to a position such that it will lie in the path of the magnetic flux of the field-coils 1 and 2, the positions of these coils being as indicated by the dotted lines in Fig. 1. However, when the field-coils are connected in circuit and the magnetic field is established thereby, the needle will move in one direction or the other, depending on the direction of flow of current in the field-coils, until the movement of the needle is arrested by one of the stops. The base of the compass is provided with an arrow indicating the direction in which the needle will move when the proper connections are made, and if the needle moves in the opposite direction the connections to the field-coils of the meter should be reversed. The relative positions of the field-coils 1 and 2 and the permanent magnets 7 and the polarity of the permanent magnets is shown in Fig. 3, and from this it will be seen that the stray flux from both pairs of magnets passing through the compass is in the same direction, and that this direction is the direction of the length of the needle 32 when the ends of the latter are equidistant from the stops 33; needle 32 is therefore normally biased to the position in which it is shown in the drawings. Furthermore, I supplement this directive force acting upon the needle 32, by means of a small strip or bar of iron or steel secured to the base of the compass adjacent to the needle 32 and extending in a direction parallel to the length of the needle when the latter is positioned with its ends equidistant from the stops 33. This strip or bar is shown at 34 in Fig. 2.

When a meter of the character described is so placed that its field flux coincides with or is directly opposed to the terrestrial magnetism or other stray fields, its operation will be subject to an error known as "stray field error." However, if the meter is turned so that its field flux is at right angles to the stray field, such error is avoided. The compass above referred to permits of readily positioning the test-meter with its field flux at a right angle to that of the stray field. The needle of the compass, as above explained, is biased magnetically to a position at right angles to the field flux of the meter, and in order that the meter will not be subjected to error by stray fields it is only necessary to turn the meter bodily to such position that the needle 32 of the compass is in the position in which it is shown in Fig. 2, in which position the stray-field flux is in the direction of the length of the needle, and hence is at right angles to the flux of the field-coils of the instrument.

Having now described my invention, what I claim as new therein and desire to secure by Letters Patent is as follows:

1. A commutator type, integrating, watt-hour meter having a field-coil adapted to be connected in series in one line of a circuit, a rotatable shaft, an armature mounted on said shaft in inductive relation to said field-coil, a resistance, wires connecting said resistance in series with said armature across the lines of the circuit, a movable contact for varying the amount of said resistance in circuit, a member on which said contact is mounted, means for securing the contact to said member in various positions of adjustment and means for adjusting the position of said member, substantially as set forth.

2. A commutator type, integrating, watt-hour meter having a field-coil adapted to be connected in series in one line of a circuit, a rotatable shaft, an armature mounted on said shaft in inductive relation to said field-coil, a disk upon said shaft, a permanent magnet in coöperative relation to said disk, a thermometer mounted adjacent to said disk, a resistance consisting of a material having a temperature coefficient of resistance which is substantially zero and having an ohmic value which is large relatively to that of said armature, wires connecting said resistance in series with said armature across the lines of the circuit, and a movable contact for varying the amount of said resistance in circuit, substantially as set forth.

3. A commutator type, integrating, watt-hour meter having a field-coil adapted to be connected in series in one line of a circuit, a rotatable shaft, an armature mounted on said shaft in inductive relation to said field-coil, a disk on said shaft, a permanent magnet mounted in coöperative relation to said disk, a frame for the instrument, a compass mounted on said frame, and means for limiting the extent of movement of the needle of said compass, substantially as set forth.

4. A commutator type, integrating, watt-hour meter having a field-coil adapted to be connected in series in one line of a circuit, a rotatable shaft, an armature mounted on said shaft in inductive relation to said field-coil, a disk on said shaft, a permanent magnet mounted in coöperative relation to said disk, a frame for the instrument, a compass mounted on said frame, and means for precluding movement of the needle of said compass into parallelism with the lines of force of said field-coil, substantially as set forth.

5. A commutator type, integrating, watt-hour meter having a field-coil adapted to be connected in series in one line of a circuit, a rotatable shaft, an armature mounted on said shaft in inductive relation to said field-coil, a disk on said shaft, a permanent magnet mounted in coöperative relation to said disk, a frame for the instrument, a compass mounted on said frame, means for limiting the extent of movement of the needle of said compass, and a strip of magnetic material mounted adjacent to the needle of said compass and immovable with respect to said needle, substantially as set forth.

6. A commutator type, integrating, watt-hour meter having a field-coil adapted to be connected in series in one line of a circuit, a rotatable shaft, an armature mounted on said shaft in inductive relation to said field-coil, a disk on said shaft, a permanent magnet mounted in coöperative relation to said disk, a frame for the instrument, a compass mounted on said frame, and means for precluding movement of the needle of said compass into parallelism with the lines of force of said field-coil but permitting movement of said needle into parallelism with the lines of force set up by said permanent magnet, substantially as set forth.

7. A commutator type, integrating, watt-hour meter having a field-coil adapted to be connected in series in one line of a circuit, a rotatable shaft, an armature mounted on said shaft in inductive relation to said field-coil, a disk on said shaft, two pairs of permanent magnets mounted in coöperative relation to said disk, a frame for the instrument, and a compass mounted on said frame, said pairs of magnets being so arranged that the stray flux from both pairs passes through the needle of said compass in the same direction, substantially as set forth.

This specification signed and witnessed this 5th day of June, 1909.

WILLIAM J. MOWBRAY.

Witnesses:
D. S. EDMONDS,
I. McINTOSH.

---

Copies of this patent may be obtained for five cents each, by addressing the "Commissioner of Patents. Washington, D. C."